UNITED STATES PATENT OFFICE.

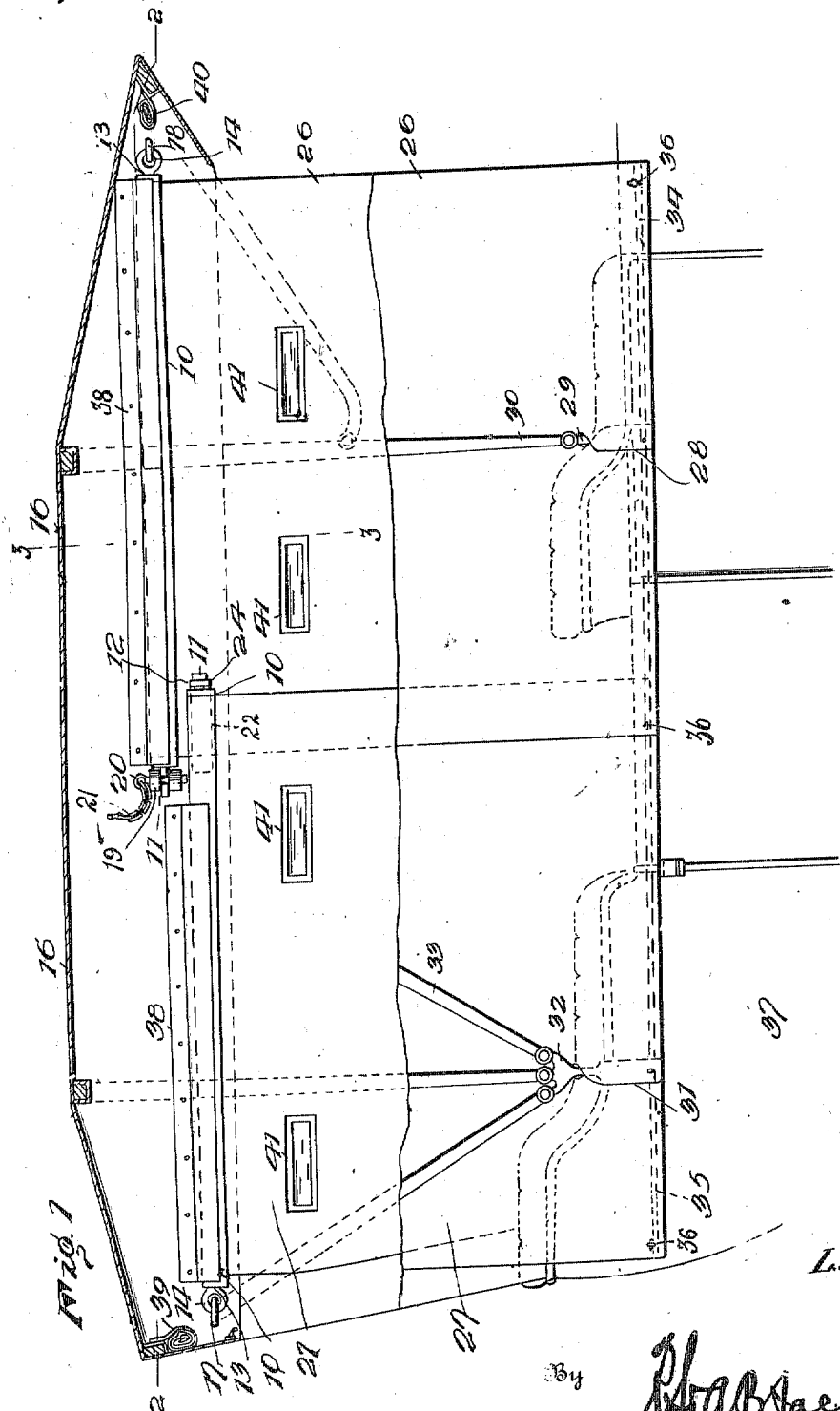

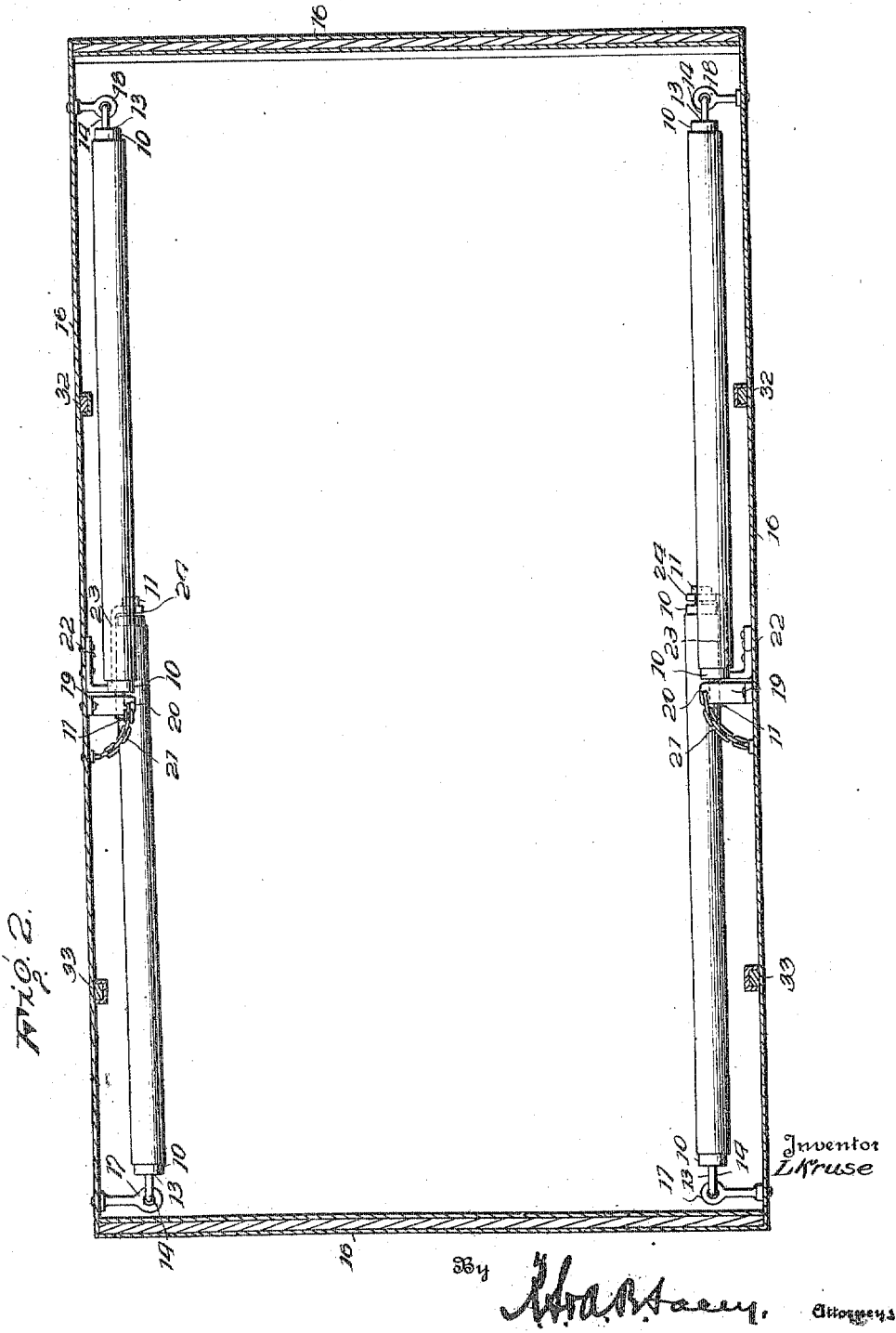

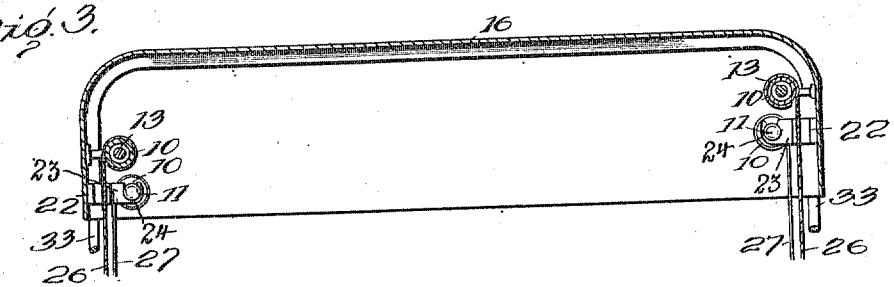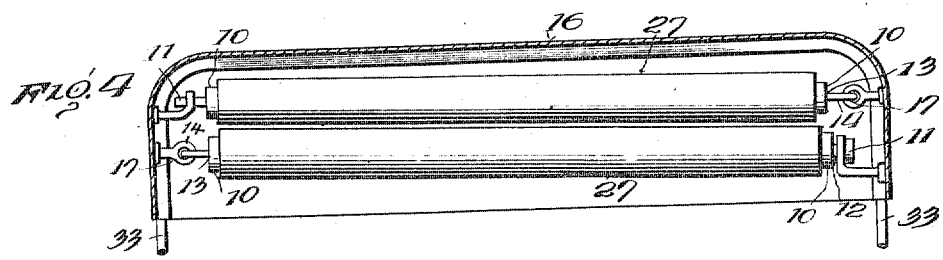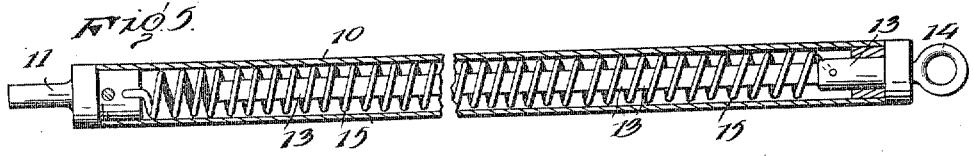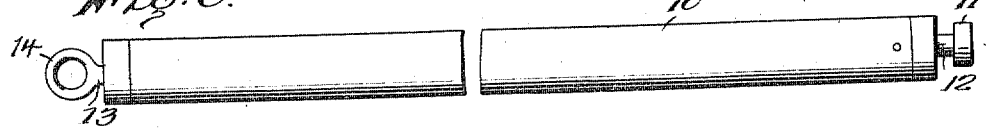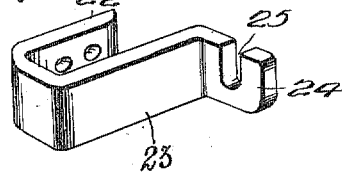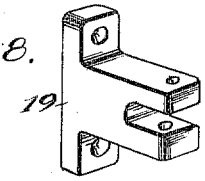

LIPPE KRUSE, OF SCOTLAND, SOUTH DAKOTA.

STORM-CURTAIN.

1,223,702.   Specification of Letters Patent.   Patented Apr. 24, 1917.

Application filed May 6, 1916. Serial No. 95,840.

*To all whom it may concern:*

Be it known that I, LIPPE KRUSE, a citizen of the United States, residing at Scotland, in the county of Bonhomme and State of South Dakota, have invented certain new and useful Improvements in Storm-Curtains, of which the following is a specification.

This invention relates to improvements in storm curtains adapted to be attached to automobiles, some forms of carriages, and like vehicles, and has for one of its objects to improve the construction and increase the efficiency and utility of devices of this character.

Another object of the invention is to provide a simply constructed device which may be rolled up when not in use and disposed out of the way within the automobile or other vehicle top.

Another object of the invention is to provide a device of this character which may be disposed transversely of the vehicle when applied to a folding top.

Another object of the invention is to provide a device of this character including forward and rear side curtains, with the forward curtains overlapping the rear curtains to prevent the entrance of wind, rain or snow when the vehicle is moving forwardly.

With these and other objects in view, the invention consists in certain novel features of construction, as hereinafter shown and described and then specifically pointed out in the claim.

The improved device is adapted more particularly to the folding tops of automobiles, but may be applied without material structural change to many forms of folding carriage tops, but for the purpose of illustration is shown applied to a conventional folding top of an automobile, and in the drawings illustrative of this embodiment of the invention—

Figure 1 is a side elevation of a conventional folding top of an automobile with the upper portion in longitudinal section;

Fig. 2 is a plan view with the top in section on the line 2—2 of Fig. 1;

Fig. 3 is a transverse section on the line 3—3 of Fig. 1;

Fig. 4 is a view similar to Fig. 3 showing the curtains rolled and arranged transversely of the vehicle top in position to be disposed within the top when the latter is folded;

Fig. 5 is an enlarged longitudinal section of one of the forward spring rollers;

Fig. 6 is an enlarged view of one of the rear spring rollers;

Fig. 7 is an enlarged perspective view of one of the supporting brackets of the forward end of one of the rear spring rollers.

Fig. 8 is an enlarged perspective view of one of the supporting brackets of the rear end of one of the forward spring rollers.

Corresponding and like parts are referred to in the following description and indicated in all the views of the drawings by the same reference characters.

The improved device comprises a plurality of curtain rollers, generally two at each side of the vehicle top, and overlapping at their confronting ends so that the curtain material likewise overlaps, the object to be hereafter explained. One of the rollers is disposed at each side of the forward part of the top and extends for a short distance past the center, while another roller is disposed at each side of the rear portion of the top and extends for a short distance past the center. The rollers are substantially alike and each comprises a cylindrical body portion 10 having a journal or stud 11 at one end rigidly connected to and extending for a distance within the roller, as shown in Fig. 5.

For the purpose of this description the rollers, which are disposed at the forward portion of the top, will be referred to as the forward rollers and the rollers, which are disposed at the rear portion of the top, will be referred to as the rear rollers. The forward rollers will be arranged with the studs 11 pointing toward the rear, while the rear rollers will be arranged with the studs 11 pointing toward the forward end of the top, as shown in Fig. 1. The studs 11 of the forward rollers are somewhat longer than the similar studs 11 of the rear rollers. The studs 11 of the rear rollers are each provided with an annular groove 12, but otherwise are substantially the same as the studs of the forward rollers. Mounted for rotation in the forward end of each of the forward rollers and the rear end of each of the rear rollers, is a pin or rod 13 each having a terminal eye 14 externally of the roller, each rod 13 extending nearly the entire distance within the roller, the inwardly extending portion being preferably reduced, as shown in Fig. 5. A coiled spring 15 is connected at one end to the inwardly directed portion of the stud 11 and at the other end to the pin 13 near the opposite end of the roller. Connected to the interior of the vehicle top, represented as a whole at 16, at each side at the rear, are eyes 17, while similar eyes 18 are connected to the top near the forward end at each side. The eyes 14 of the pin 13 of the rear rollers are hingedly united respectively to the rear eyes 17, while the eyes 14 of the pins 13 of the forward rollers are hingedly connected respectively to the forward eyes 18. By this means the rollers are adapted to swing transversely of the top when not in use, as hereafter explained.

Attached to the vehicle top at each side is a bracket-like device 19 each having a socket to receive one of the pins 11 of the forward roller, each bracket having apertures to receive a holding pin 20 to retain the stud 11 in position and thus rotatably support the inner end of the forward roller. Each of the pins 20 is provided with a section of chain 21 to connect them to the vehicle top when not in use and prevent them from being lost. Attached to the interior of the vehicle top at each side is another bracket comprising a base portion 22 riveted or otherwise attached to the material of the vehicle top and bent intermediate its ends and extended in parallel relation to the base 22, as shown at 23, and thence bent at right angles or toward the interior of the top, as shown at 24, the portion 24 having an upwardly opening socket 25 to receive the annular portion 12 of the stud 11. The juncture of the portions 22—23 is located beyond the inner end of the forward roller 10 so that a passage is provided for the curtain material of the forward roller between the portions 22—23, as hereafter explained.

The brackets 19 are located above the line of the brackets just described, as illustrated in Fig. 1, to provide for the overlapping of the curtain material before mentioned. The curtain material of the forward rollers is represented conventionally at 26, while the curtain material of the rear rollers is indicated conventionally at 27. The curtain material will be attached in any suitable manner to the rollers and the springs 15 will operate to maintain the curtain material normally fully rolled upon the rollers. Each of the curtains 26 is formed with a cleft or recess, indicated at 28, to enable the curtain to be arranged around the support or bracket 29 of the forward support or bow 30, while the curtains 27 are each provided with a similar recess or cleft 31 to engage around the bracket member 32 of the rear bows or supports 33. Embedded in the lower edge of each of the curtains is a wire stiffening member, indicated respectively at 34 35. Any suitable means may be employed for retaining the curtains in their lowered or open position, but generally pins, represented at 36, will be employed for this purpose and projecting from the side of the body of the vehicle, the latter being represented conventionally at 37. The springs 15 are held in strained position when the curtains are lowered and when released from the pins the reaction of the springs will automatically roll up the curtains, as will be obvious. Attached to the top 16 at each side and above each roller is a guard member, indicated conventionally at 38, and extending over the rollers and protecting them when disposed in operative position, as shown in Fig. 1. The members 38 are preferably formed of suitable fabric material, such as rubber cloth, and will yield when the curtain rollers are to be disposed transversely of the top.

Connected to the rear end of the top 16 is another guard member indicated as a whole at 39 and adapted to be folded around the rollers to protect them when they are disposed transversely of the top, and a similar guard is connected to the top 16 at the front end, indicated conventionally at 40, and adapted to be folded around the forward rollers when the latter are disposed transversely of the top. When the improved devices are not in use the springs 15 will maintain the curtains in rolled position and out of the way, and when thus arranged the curtains may be very quickly drawn downwardly and connected to the pins 36 when it is required to protect the passengers of the vehicle. The forward curtains may be drawn downwardly and connected in position independently of the rear curtains, while the rear curtains may be drawn downwardly and connected to the pins independently of the forward curtains, or the curtains of one side may be drawn downwardly without reference to the curtains at the opposite side, the overlapping of the contiguous edges of the curtains effectually excludes wind, rain, snow and the like, especially when the vehicle is moving forwardly.

While the improved devices are more particularly applicable to automobile tops as previously explained, they may be likewise adapted for certain forms of carriage and like vehicles without material structural change. The usual observation openings covered by glass, mica, celluloid, or the like, and indicated at 41 will be arranged within the curtains, and the rollers 10 will be sufficiently large so that the cover material for the openings 41, if of glass, will not be broken when thus disposed upon the rollers.

Having thus described the invention, what is claimed as new is:

In a device of the class described, forward and rear curtain rollers carrying curtain material, said rollers adapted to be swingingly connected respectively at their outer ends to a vehicle top with the forward roller and the curtain material thereof overlapping the rear roller and the curtain material thereof, a bracket device including side portions in spaced relation and connected at their rear ends, one of said side portions adapted to be connected to the vehicle top and the other side portion provided with a socket to detachably support the forward end of the rear roller, and another bracket device adapted to be connected to the vehicle top rearwardly of the first mentioned bracket device and having means for detachably supporting the rear end of the forward roller, whereby when the curtain material is unrolled the rear portion of the forward curtain material will overlap the forward portion of the rear curtain material and prevent the entrance of the elements when the vehicle is moved forwardly.

In testimony whereof I affix my signature.

LIPPE KRUSE. [L. S.]